United States Patent [19]

Ashfield et al.

[11] 4,043,546

[45] Aug. 23, 1977

[54] COMPRESSION SPRINGS

[75] Inventors: Herbert Edward Ashfield; Harry Horsfall, both of Huddersfield, England

[73] Assignee: David Brown Tractors Limited, Huddersfield, England

[21] Appl. No.: 647,746

[22] Filed: Jan. 9, 1976

[30] Foreign Application Priority Data

Jan. 16, 1975 United Kingdom ............... 1951/75

[51] Int. Cl.² .............................................. F16F 1/34
[52] U.S. Cl. .................................... 267/162; 267/181
[58] Field of Search .................. 267/21 R, 63 R, 161, 267/162, 163, 164, 165, 141, 152, 153, 181, 182

[56] References Cited

U.S. PATENT DOCUMENTS

| 2,171,185 | 8/1939 | Maier | 267/181 X |
| 2,551,505 | 5/1951 | Olson | 267/63 R X |
| 2,744,773 | 5/1956 | Cliborn | 267/161 X |
| 3,434,708 | 3/1969 | Hawk | 267/153 X |
| 3,480,268 | 11/1969 | Fishbaugh | 267/63 R X |
| 3,831,922 | 8/1974 | Appleton | 267/152 X |

FOREIGN PATENT DOCUMENTS

| 1,090,004 | 3/1955 | France | 267/181 |
| 1,291,122 | 9/1972 | United Kingdom | |

Primary Examiner—Johnny D. Cherry
Attorney, Agent, or Firm—Norris & Bateman

[57] ABSTRACT

A compression spring capable of having a very high rate comprises co-axial annular plates alternating in an axial direction with diametrical strips adjacent ones of which are perpendicular to one another. The spring may comprise a stack of washers with diametrically opposed pads or radial ribs on their faces, said washers having non-circular bores enabling them to be located non-rotatably on a correspondingly non-circular central support. Alternatively, the spring may comprise a single tubular element with pairs of diametrically opposed tangential slots perpendicular to its axis which extend from its periphery into its bore.

6 Claims, 9 Drawing Figures

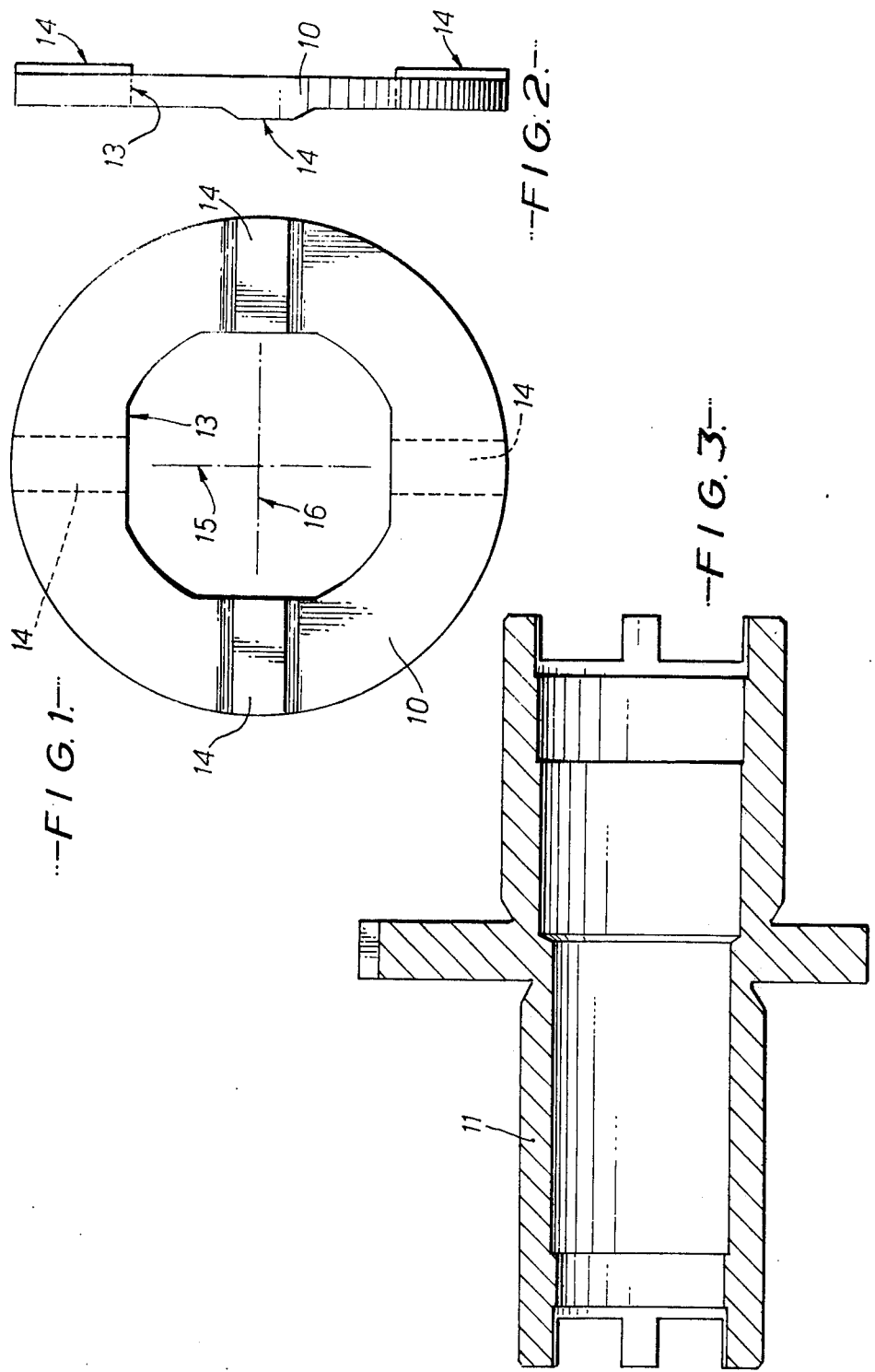

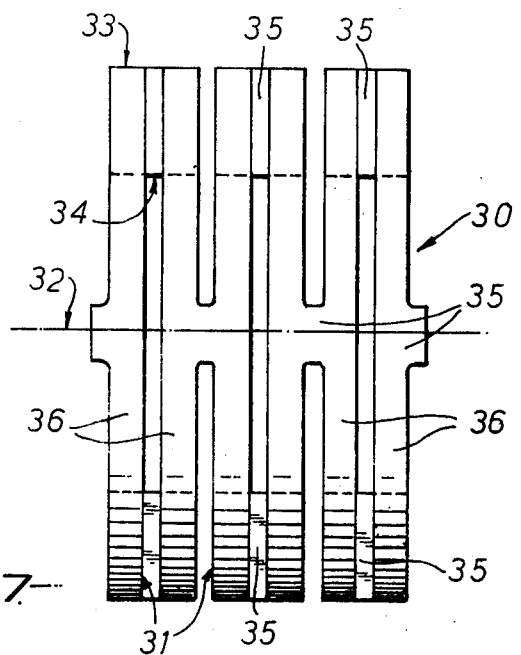
-FIG.7-
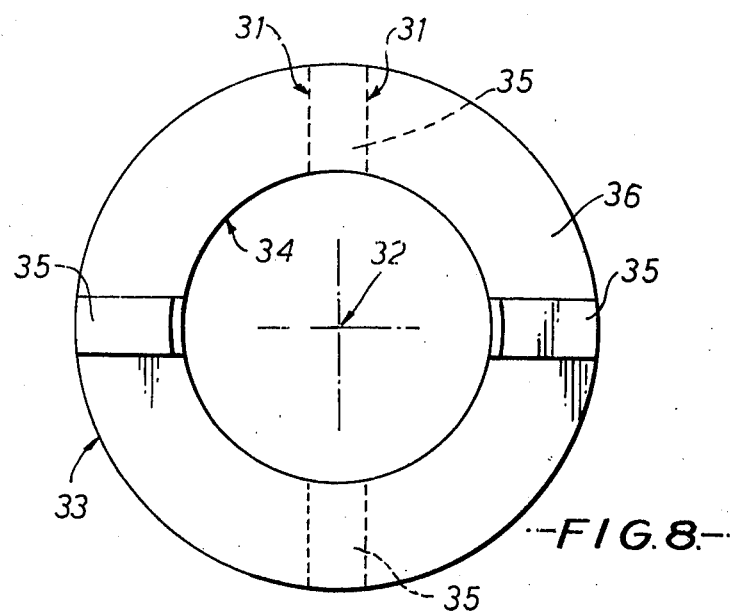
-FIG.8-

COMPRESSION SPRINGS

BACKGROUND OF INVENTION

The invention relates to compression springs, and has for its object to provide a novel form of compression spring capable of having a high rate.

SUMMARY OF INVENTION

According to the invention, a compression spring comprises co-axial plates with central voids, said plates alternating in an axial direction with diametrical strips and adjacent ones of said strips being disposed at an angle to one another.

BRIEF DESCRIPTION OF DRAWINGS

The invention will now be described, by way of example, with reference to the accompanying drawings of which:

FIG. 1 is an end elevation of a component of one embodiment of the invention;

FIG. 2 is a side elevation of said component;

FIG. 3 is a sectional side elevation of another component of said one embodiment;

FIG. 7 is a side elevation of a further embodiment of the invention;

FIG. 8 is an end elevation of said further embodiment; and

DESCRIPTION OF PREFERRED EMBODIMENT

Figure 4:
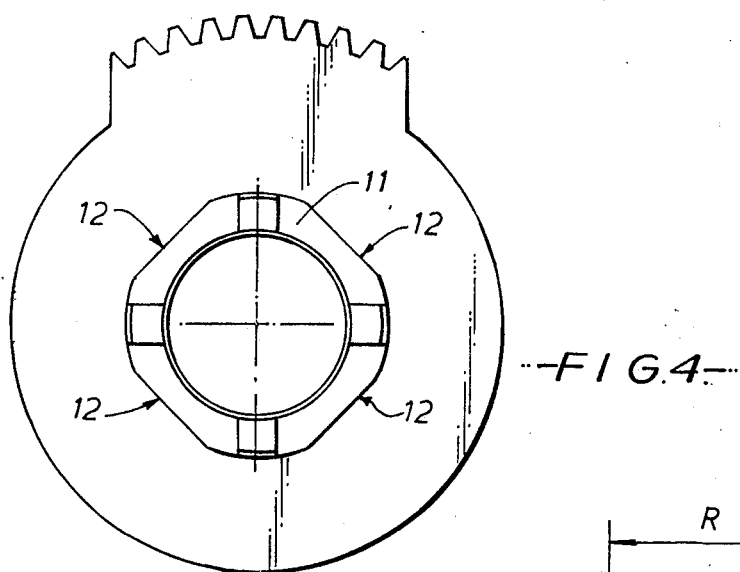
FIG. 4 is an end elevation of said other component.

Referring now to FIGS. 1 to 4, in one embodiment of the invention a composite compression spring comprises a stack of special washers such as 10 located co-axially on a central tubular support 11 of spheroidal graphite iron. Said support has four identical longitudinal flats 12 each of which is perpendicular to the two adjacent flats, and each washer 10 has a correspondingly profiled bore 13 to enable it to be located non-rotatably on the support 11. Each washer 10 comprises an annular plate having two diametrically opposed radial ribs 14 on each of its faces, the centre-line 15 of the ribs on one face being at a right angle to the centre-line 16 of those on the other face. The ribs 14 on adjacent faces of adjacent washers 10 are arranged to abut against one another so as together to constitute in effect a single diametrical strip, the strips alternating in an axial direction with the annular plates. The washers 10 are of forged alloy steel, heat treated after the completion of machining.

Figure 5:
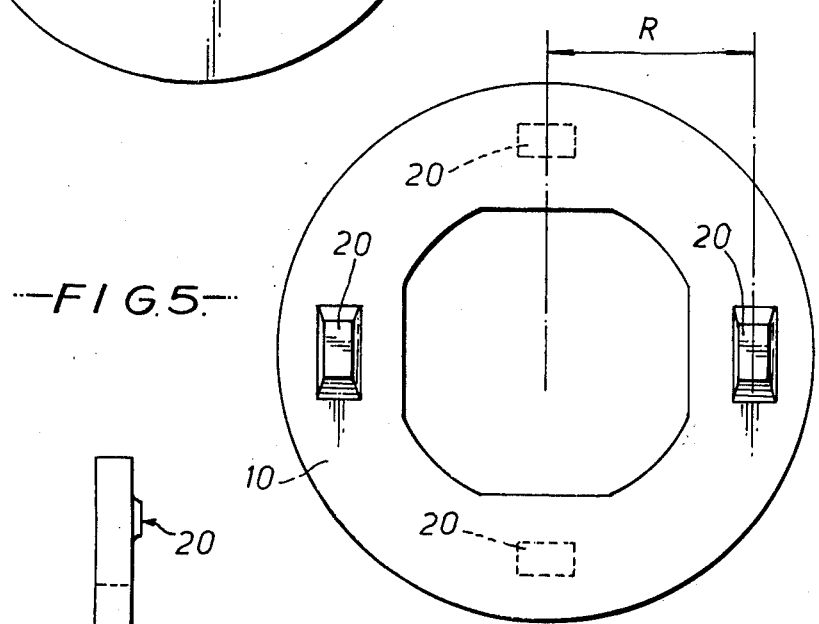
FIG. 5 is an end elevation corresponding to FIG. 1 of a component of another embodiment of the invention.
Figure 6:
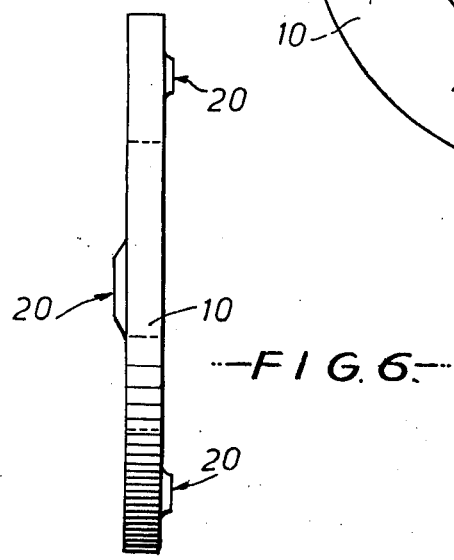
FIG. 6 is a side elevation corresponding to FIG. 2 of the component shown in FIG. 5.

Referring now to FIGS. 5 and 6, in another embodiment of the invention which is basically similar to said one embodiment thereof and utilises the same central tubular support 11, each washer 10 is provided with diametrically opposed pads 20 instead of the aforementioned radial ribs 14, in order to obtain different load/deflection characteristics, for example a non-linear rate. With this arrangement, the mean radius R of the pads 20 can be varied to vary said characteristics.

Referring now to FIGS. 7 and 8, in a further embodiment of the invention a unitary compression spring comprises a tube 30 in which are milled narrow, closely spaced slots 31 perpendicular to its axis 32 which extend from its periphery 33 into its bore 34. The slots 31 are in diametrically opposed pairs, each pair lying in the same plane and being separated by two diametrically opposed radial strips 35 which together constitute in effect a single diametrical strip. The diametrical strips alternate in the direction of the axis 32 with co-axial annular platelike portions 36 of the tube, and adjacent ones of the diametrical strips are disposed at a right angle to one another. The unitary spring is of alloy steel, heat treated after the completion of machining.

All three embodiments of the invention hereinbefore described operate in substantially the same manner, the approximately semi-circular unsupported portions of the annular plates acting as individual cantilever leaf springs. Very high spring rates are readily obtainable. The rate of the spring is variable by varying the axial thickness and/or the radial width of the annular plates, and its maximum compression can be limited by providing diametrical strips which are suitably narrow in an axial direction.

In a modification of said one or said other embodiment, each washer has two diametrically opposed ribs or pads on only one of its faces, said ribs or pads thus together constituting in effect the whole of a diametrical strip. In another modification of said one or said other embodiment, the washers are located non-rotatably at their outer peripheries instead of on a central support. In a further modification of said one or said other embodiment, the diametrical strips are continuous instead of being constituted by discontinuously disposed ribs or pads, for example said diametrical strips are separate components located in diametrical grooves formed in the faces of the washers. In one modification applicable to all three embodiments of the invention hereinbefore described, adjacent ones of the diametrical strips are disposed relative to one another at an angle other than a right angle. For example, if each of three consecutive strips is disposed at an angle of 60° to the other two, the rate of the spring is increased. In another modification applicable to all three embodiments of the invention hereinbefore described, the plates are not annular but are, for example, square with a central void.

Figure 9:
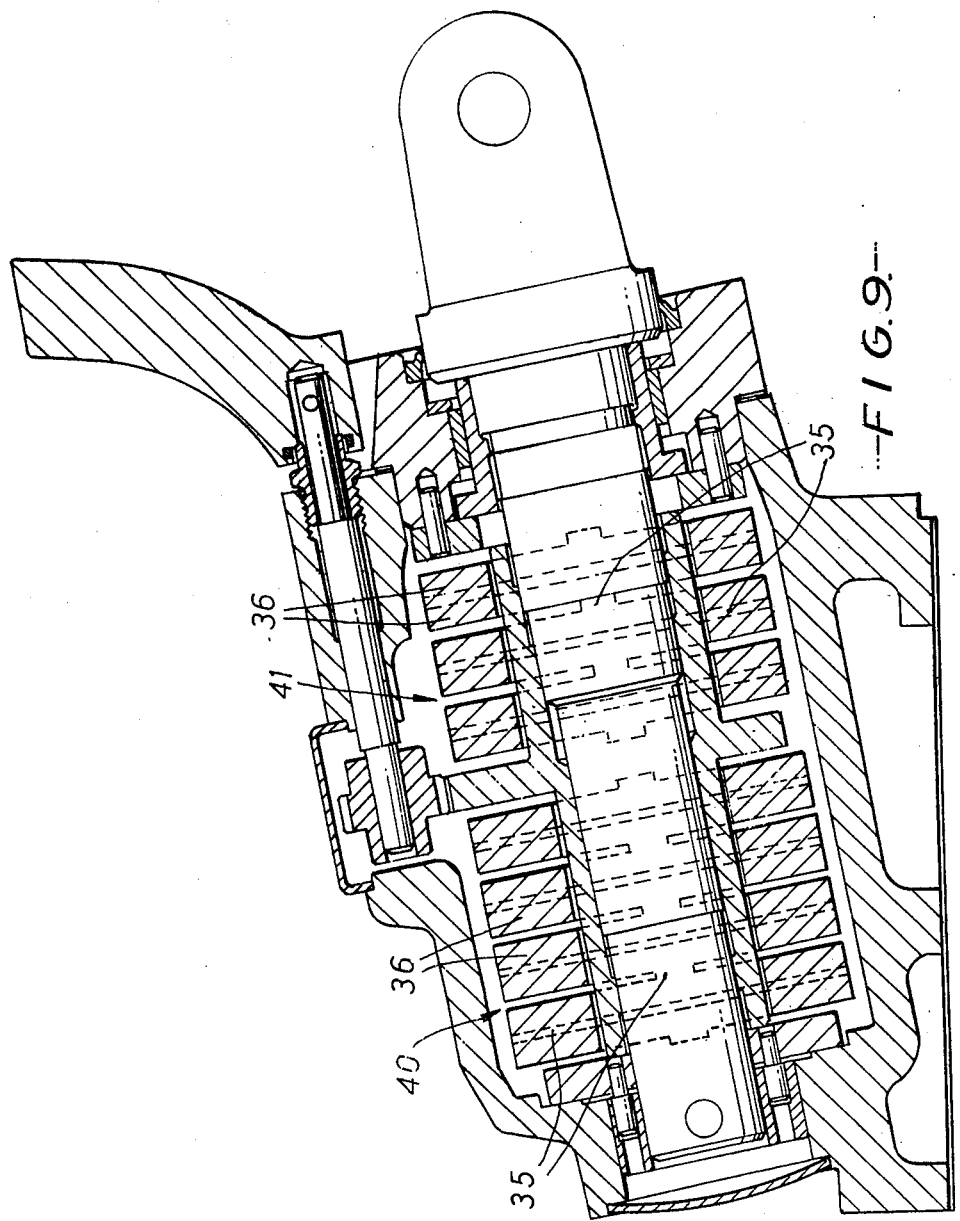
FIG. 9 is a sectional side elevation of a triple-rate signalling unit, for a draft controlled tractor power lift mechanism, in which two springs in accordance with said further embodiment are employed.

High rate springs in accordance with the invention are capable of wide application, and are for instance very suitable for use in signalling units for draft controlled tractor power lift mechanisms. Referring now to FIG. 9, in a triple-rate signalling unit basically the same as that disclosed in the printed specification of our United Kingdom Patent No. 1291122, two springs 40 and 41 of mutually different high rates and each in accordance with said further embodiment of the present invention are employed, the higher rate spring 40 having radial strips 35 which are narrower in an axial direction, and annular plates 36 which are greater in radial width, than the lower rate spring 41. The higher rate spring 40 is also longer than the lower rate spring 41. In a single-rate signalling unit, a single high rate spring in accordance with the present invention can advantageously be employed. In a dualrate signalling unit such as either of those disclosed in the printed specification of our United Kingdom Patent No. 1141719, two high rate springs in accordance with the present invention can advantageously be employed.

What we claim is:

1. A compression spring comprising a support, a stack of separate coaxial washers surrounding said support and nonrotatably mounted on and along said support, each of said washers comprising an annular spring plate having a set of diametrically opposed projections on one side and another set of diametrically opposite projections on the other side, said sets being displaced at right angles, and the projections on each plate axially abutting the correspondingly oriented projections of the next adjacent plate in the stack.

2. A compression spring according to claim 1, wherein said support passes through the center of the spring and has longitudinal flats, and the washers have correspondingly profiled bores to enable the washers to be mounted non-rotatably on the support.

3. The compression spring defined in claim 1, wherein each of said sets of projections comprises two diametrally opposed ribs on the plate surface.

4. The compression spring defined in claim 1, wherein each of said sets of projections comprises two diametrically opposed pads on the plate surface.

5. A signalling unit, for a draft controlled tractor power lift mechanism, including at least one compression spring according to claim 1.

6. A triple-rate signalling unit, for a draft controlled tractor power lift mechanism, including two compression springs of different rates and each according to claim 1.